(12) United States Patent
Lonergan et al.

(10) Patent No.: US 6,787,170 B2
(45) Date of Patent: Sep. 7, 2004

(54) FRIED TEXTURE IMPARTING GLAZE FOR A FOOD INTERMEDIATE AND METHOD OF MAKING A PRODUCT AND A PRODUCT PRODUCED THEREBY

(75) Inventors: Dennis A. Lonergan, Medina, MN (US); Trudi R. Rodne, Eagan, MN (US); Iris A. Wang, New Brighton, MN (US)

(73) Assignee: The Pillsbury Company, Minneapolis, MN (US)

( * ) Notice: Subject to any disclaimer, the term of this patent is extended or adjusted under 35 U.S.C. 154(b) by 228 days.

(21) Appl. No.: 10/195,043

(22) Filed: Jul. 12, 2002

(65) Prior Publication Data

US 2004/0009272 A1 Jan. 15, 2004

(51) Int. Cl.$^7$ ............................ A21D 8/00; A21D 13/00
(52) U.S. Cl. ................. 426/94; 426/289; 426/302; 426/496; 426/553; 426/572; 426/602; 426/650
(58) Field of Search .................. 426/94, 96, 99, 426/289, 293, 296, 302, 496, 553, 578, 602, 650, 653

(56) References Cited

U.S. PATENT DOCUMENTS

| | | | |
|---|---|---|---|
| 2,012,506 A | 8/1935 | Griffith | 99/111 |
| 3,088,829 A | 5/1963 | Rapaport | 99/139 |
| 3,505,076 A | 4/1970 | Maloney et al. | 99/81 |
| 3,586,512 A | 6/1971 | Mancuso et al. | 99/100 |
| 3,830,941 A | 8/1974 | Luft et al. | 426/177 |
| 3,843,827 A | 10/1974 | Lee et al. | 426/293 |
| 3,852,501 A | 12/1974 | Fazzina et al. | 426/296 |
| 3,880,941 A | 4/1975 | Davegårdh et al. | 260/644 |
| 4,218,485 A | 8/1980 | Lee et al. | 426/296 |
| 4,293,572 A | 10/1981 | Silva et al. | 426/19 |
| 4,389,420 A | 6/1983 | Yong et al. | 426/94 |
| 4,588,600 A | 5/1986 | Suderman | 426/555 |
| 4,609,555 A | 9/1986 | Becher et al. | 426/94 |
| 4,640,837 A | 2/1987 | Coleman et al. | 426/94 |
| 4,645,674 A | 2/1987 | Lang et al. | 426/94 |
| 4,762,721 A | 8/1988 | Holscher et al. | 426/94 |
| 4,913,919 A | 4/1990 | Cornwell et al. | 426/94 |
| 5,254,353 A | 10/1993 | Huang et al. | 426/94 |
| 5,393,552 A * | 2/1995 | Busacker et al. | 426/637 |
| 5,466,478 A | 11/1995 | Brockhus et al. | 426/602 |
| 5,492,707 A | 2/1996 | Chalupa et al. | 426/302 |
| 5,532,010 A | 7/1996 | Spanier et al. | 426/94 |
| 5,536,520 A * | 7/1996 | Seeds et al. | 426/549 |
| 5,679,390 A * | 10/1997 | Conover | 426/96 |
| 5,798,132 A | 8/1998 | Chen et al. | 426/305 |
| 5,827,553 A | 10/1998 | Dimitroglou et al. | 426/89 |
| 5,965,180 A * | 10/1999 | Lonergan | 426/94 |
| 5,989,603 A | 11/1999 | Lonergan et al. | 426/94 |
| 6,033,697 A * | 3/2000 | Judkins et al. | 426/102 |
| 6,265,005 B1 * | 7/2001 | Haverkos et al. | 426/302 |

OTHER PUBLICATIONS

Google Search—Maltodextrin. Pformulate Exipients Maltodextrin– Description, Physical characteristics. Pformulate Apr. 20, 2000.*
Beard, 1973, *Beard on Bread*, Ballantine Books, N.Y., pp. 195, 198, 206, 212, 224.
Greenstein, 1993, *Secrets of a Jewish Baker: Authentic Jewish Rye and Other Breads*, The Rossing Press, Freedom, CA, pp. 112–115.
Collin, 1975, *The New Orleans Cookbook*, Alfred A. Knopf, Inc., p. 200.
W. F. Talburt and O. Smith, 1987, *Potato Processing*, 4$^{th}$ edition, AVI Publishing, pp. 503–513.

* cited by examiner

*Primary Examiner*—N. Bhat
(74) *Attorney, Agent, or Firm*—Douglas J. Taylor; John A. O'Toole

(57) ABSTRACT

The present invention provides a fried texture-imparting glaze for a food intermediate useable in producing a finished food product. The glaze comprises an edible oil, and an anhydrous low-density maltodextrin. In use, glaze is used to at least partially coat the food intermediate. The present invention also relates to a method of imparting a fried surface texture to a food product comprising the steps coating at least a portion of a food intermediate with a glaze composed of an edible oil and an anhydrous low density maltodextrin, followed by the step of baking the food product. The invention also relates to a dough intermediate having a fried texture-imparting glaze coated on at least a portion of a surface of the food product.

21 Claims, 2 Drawing Sheets

FRIED TEXTURE IMPARTING GLAZE FOR A FOOD INTERMEDIATE AND METHOD OF MAKING A PRODUCT AND A PRODUCT PRODUCED THEREBY

CROSS-REFERENCES TO RELATED APPLICATIONS

None.

BACKGROUND OF THE INVENTION

In the manufacture of many types of food products such as doughnuts, pizza doughs, pizza rolls, beignets, pizza pockets, taco shells, French fries, tortilla shells and the like, it is often desirable to endeavour to impart a fried like texture to these products through a pseudo frying/baking step. The reason for this is that a fried food may have a softer, yet crispier crust than a traditionally baked food. The resulting rise in demand for such pseudo fried/baked products has arisen in a large part due to dietary and health concerns about the consumption of fried foods and a general avoidance of frying food products in oil or fat. Nonetheless, the appearance and texture of fried food products is desired by the consumer and therefore efforts have been made to find a way of imparting a fried like appearance and texture to a food product through a baking step.

Dough that is fried will yield different products such as doughnuts, tortilla shells and the like as opposed to one that is baked, such as a loaf of bread or rolls. That is, the frying produces differences in texture, shape, color, and flavor. Therefore, in order to give a baked product an appearance similar to one that is fried, modifications must be made to the technology of making the food.

In an attempt to address this need U.S. Pat. No. 5,989,603 (Lonergan et al.) describes the use of a water in oil emulsion and a hydrophilic colloid coating used to impart fried like properties to a baked dough product. The oil is selected from a number of edible oils and the edible hydrophilic colloid is selected from starches, natural gums and chemically modified polysaccharides.

It has been recognized that it would be desirable to attempt to eliminate the water from the glaze to improve the fried qualities of the food product after baking. The presence of water tends to lead to problems caused by the water being absorbed into the surface layer of the food product, potentially making the food soggy. In situations for example where the food product is wheat or dough based (providing a hydrophilic surface) the absorbed water can significantly affect the overall composition of the surface of the food product and impart surface properties not associated with a fried product. This can affect the shape of the dough product, as during baking and the additionally hydration causes the dough to spread out losing its desired configuration, as well as fail to achieve the desired aesthetic properties referenced above.

As such, what is needed is a process by which the beneficial textural and aesthetic features of fried foods can be obtained while simultaneously avoiding the drawbacks associated with traditional fried foods.

BRIEF SUMMARY OF THE INVENTION

In one embodiment of the present invention, the invention provides a fried texture-imparting glaze for a food intermediate that is made up of a mixture of at least one edible oil and a maltodextrin. The glaze is applied to at least a portion of the food intermediate to create a food product capable of producing a fried texture upon a further treatment step.

In a further embodiment of the present invention a method for imparting a fried surface texture to a food product is described and comprises the steps of initially coating at least a portion of a food intermediate with a mixture that includes at least one edible oil and a maltodextrin. The mixture is spread over at least a portion of the food intermediate, and then finally baking the food intermediate to produce a food product having a fried appearance.

In a yet further embodiment of the present invention there is also provided a food intermediate having a fried texture imparting glaze that is coated on at least a portion of a surface of the food intermediate, the fried texture imparting glaze comprises a mixture of least one edible oil and a maltodextrin. The mixture is applied to at least a portion of the food intermediate after forming to create a food intermediate capable of producing a fried texture without the aid of frying.

In a still further embodiment of the present invention, a method of increasing the baked specific volume of a glazed baked dough product over dimensions of a corresponding unglazed baked dough product is described and comprises the steps of initially coating at least a portion of a food intermediate with a glaze composed of at least one edible oil and an anhydrous low density maltodextrin. The food intermediate with the glaze is then baked to impart a fried texture to the baked dough product.

This invention therefore provides the advantage that unbaked dough products, when coated with the glaze of the invention, may be used to enhance the baked specific volume (BSV) of the baked product, while simultaneously imparting a fried-like texture to the baked product.

The present invention also provides a method to impart a fried texture to food products, preferably wheat based or dough products that are baked without a frying step.

All percentages are by weight (wt %) unless otherwise indicated. Further embodiments of the present invention, without limitation, will become apparent from the following figure, detailed description, and examples.

As used herein, the term "intermediate" or "food intermediate" refers to a food product that is capable of undergoing one or more further treatment steps to produce a finished food product. Food intermediates include dough, such as grain-based dough useable in the creation of bread, doughnuts, cereals and the like as well as batter coated items such as vegetables, French fries, seafood, meats and the like.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

Figure 1:
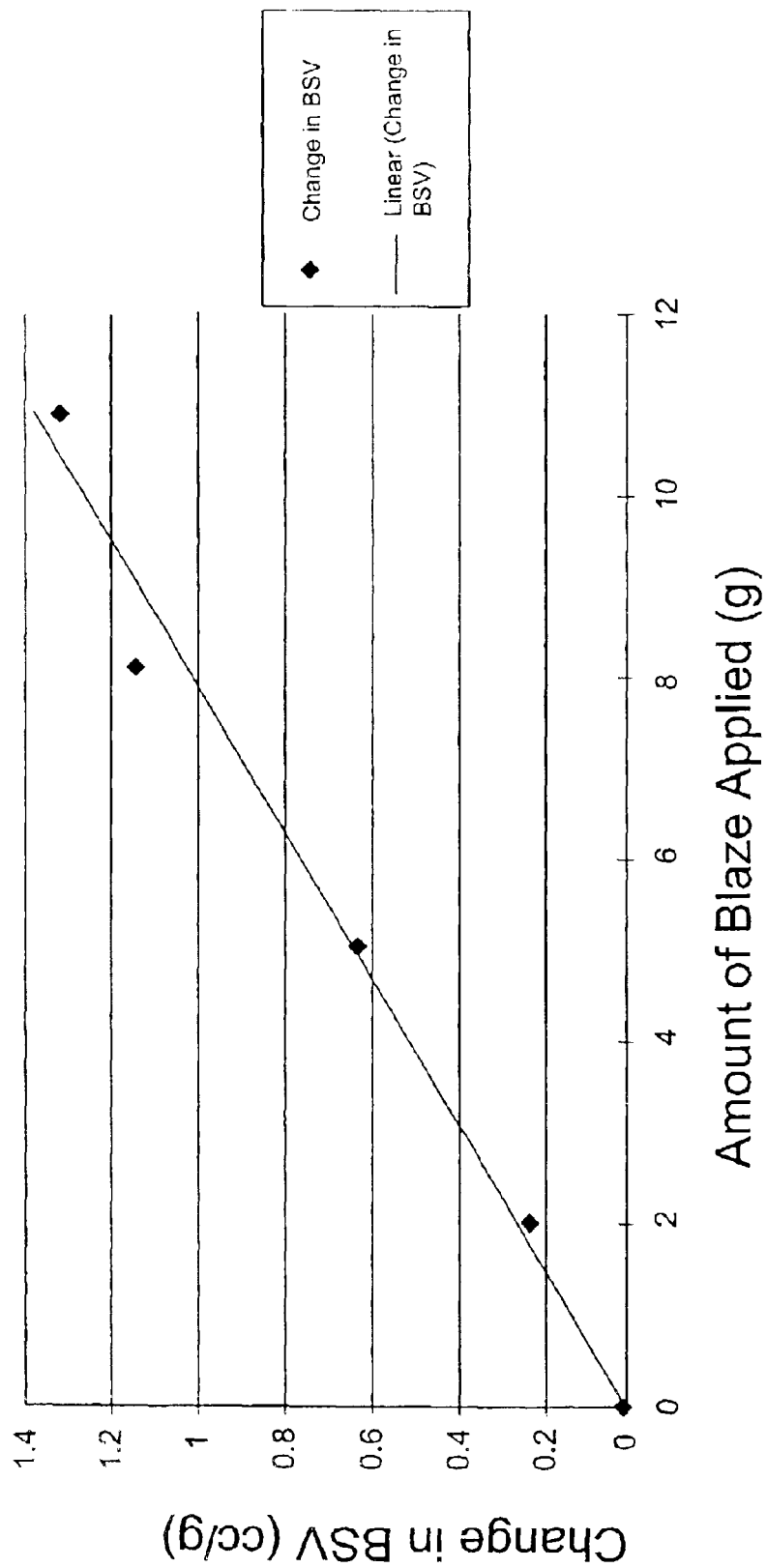
FIG. 1 is a chart illustrating the change in the baked specific volume compared with the amount of glaze used.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The applicant has made the surprising discovery that the application of the anhydrous glaze to food intermediate, followed by an additional treatment or treating step such as baking, imparts a fried texture to the baked food product while, in the case of dough products, also increasing the baked specific volume ("BSV") of the dough. Other treatment steps may include application of microwave energy, open flame cooking (barbequing) and the like.

The dimensions or product geometry of a baked product are related to the dimensions of the raw dough product. Traditionally, to obtain a baked product with a desired specific volume or geometry, the dough would have to obtain a certain geometry just prior to baking. Application of the anhydrous glaze of the present invention to dough products prior to baking surprisingly and unexpectedly enhanced the dimensions of the dough product after baking.

In carrying out the present invention, it was discovered that by providing a vehicle that would trap and hold oil at or near the surface of the food intermediate, a food product could be created that would have a fried appearance after being subjected to a further treatment step. In the present invention, it was found that an anhydrous, low-density maltodextrin sufficiently traps and holds the oil near the surface of the intermediate upon which the glaze is coated.

As used herein, the term coated or coating refers to any number of application methods by which the glaze may be imparted to the food intermediate. Such methods include spraying, dipping, brush or roller applicators, fountains, baths, curtains and the like.

It is preferred that the density of the maltodextrin is between 0.05–0.4 g/cc, and in particular that the density is between 0.10 and 0.15 g/cc. Maltodextrin M700 (available from Grain Processing Corporation) with a density of 0.13 g/cc is the most preferred choice of low-density maltodextrin.

It is also preferred that the food product or food intermediate of the present invention is selected from a dough or grain based product, such as but not limited to a food product selected from a doughnut, pizza dough, pizza roll, beignet, pizza pocket, taco shell, tortilla shell, foccacia bread, crumpet or laminated product. The term grain based refers to doughs or other intermediate products produced from oats, wheat, barley, rice, corn, sorghum, etc.

As mentioned above, food products suitable for use as starting materials in the present invention include any food product wherein it is desirable to achieve fried-like properties without the need for a frying step. Such food products are intended to include, without limitation, a doughnut, pizza base, pizza roll, beignet, pizza pocket, taco shells, French fries, tortilla shell, foccacia bread, crumpet, batter coated products such as vegetables, meats or seafood or laminated products. Laminated products include, without limitation, croissants, flaky biscuits, Danishes and the like.

Furthermore unbaked dough products suitable for use in the present invention also include any dough products or food intermediates wherein is it desirable to produce finished products with an increased BSV over that which would normally be achievable from baking or frying an unglazed raw dough product. For example, the dough product could be initially frozen (that is below 32° F.), refrigerated (that is from about 32° F. to about 45° F.), or fresh (at ambient temperature), prior to application of additional treating steps such as baking.

Formulations of each of the above unbaked food products are well known to those skilled in the art, and are readily available to the public in commercial cookbooks. For example, Beard on Bread, incorporated herein by reference, contains at least one exemplary formulation of many of the above listed products, *Beard on Bread*, Ballantine Books, N.Y. (1973). An exemplary formulation for foccacia can be found in Greenstein, *Secrets of a Jewish Baker: Authentic Jewish Rye and Other Breads*, The Rossing Press, Freedom, Calif., pp 1I 2–115 (1993), incorporated herein by reference. An exemplary formulation for beignets, can be found in Collin, *The New Orleans Cookbook*, Alfred A. Knopf, Inc., p200, (1979), incorporated herein by reference. The preparation of unbaked French fries is also well known to those skilled in the art and is readily available to the public in commercial cookbooks. For example, *Potato Processing*, $4^{th}$ edition, W. F. Talburt and O. Smith, 1987 AVI Publishing. Many other examples exist and are simply too numerous to reference herein.

Generally, the food products suitable for use in the present invention are composed with the usual ingredients known to those skilled in the art. For the unbaked dough products the usual ingredients are flour, water and yeast. In addition to these basic ingredients, the dough products may contain sugar, non-fat milk solids, shortening, gums, surfactants, and film-forming proteins. The dough products may further comprise effective amounts of adjutants such as flavourings, thickeners such as starches and hydrophilic colloids, nutrients such as carbohydrates, proteins, lipids and the like, antioxidants, antimicrobial agents, eggs and egg solids, acidulants, dough conditioners and enzymes, emulsifiers such as mono- and diglycerides, sodium stearoyl lactylate, vitamins, and the like.

Non-fat milk solids which can be used in the food products of this invention are the solids of skim milk an include proteins, mineral matter and milk sugar. Other proteins such as casein, sodium caseinate, calcium caseinate, modified casein, sweet dairy whey, modified whey and whey protein concentrate can also be used in these doughs.

Dry or liquid flavoring agents, fruit and vegetables, may also be added to a dough formulation. These include without limitation mustard, potatoes, anchovies, capers, olives, bacon, cocoa, vanilla, chocolate, butter flavor, coconut, peppermint, pineapple, cherry, nuts, spices, salts, poppy or sesame seeds, onion, garlic, cheese, tomatoes, scallions, oat bran, jalapeno, peppers, cinnamon, raisins, chocolate chips, apples, berries, bananas, walnuts, lemon and flavor enhancers.

Acidulants commonly added to food foods include, but are not limited to, lactic acid, citric acid, tartaric acid, malic acid, acetic acid, phosphoric acid and hydrochloric acid.

Dough conditioners commonly added to dough products and may include but are not limited to potassium sorbate, L-cysteine hydrochloride, mono- and di-glycerides, polysorbates, sodium bisulfite, sodium stearoyl lactylate, ascorbic acid and diacetyltartaric acid esters of mono- and di-glycerides (DATEM). These conditioners serve to add functionality, reduce mix times, and provide softness to the doughs to which they are added.

The mixing times, temperatures and speeds for processing the dough product are known in conventional dough processing technology, but may vary depending on the particular product being prepared. Particular mixing times, temperatures and speeds for particular dough products can be readily determined by one skilled in the art using conventional processing technology.

The anhydrous glaze of the present invention provides a fried texture-imparting glaze for food product. The glaze comprises a mixture of an edible oil and a maltodextrin, preferably an anhydrous, low-density maltodextrin. The glaze or mixture as it is used herein may optionally comprise a sweetening or flavoring agent such as sucrose or dextrose. To ensure that the glaze is maintained as an anhydrous glaze, the application of any such sweeteners or flavoring should desirably also be anhydrous in nature.

A sweeter flavor can be incorporated into the glaze by increasing the sucrose levels to 10%. Additionally, the degree of browning of the fried like textured product can be modified by employing varying levels of sucrose/dextrose mixtures for example.

It may also be desirable to include an amount of a reducing sugar in the glaze to provide a browning agent thereby imparting a golden brown color to the final baked product. Reducing sugars useful in the practice of the present invention include, but are not limited to, dextrose, maltose, isomaltose, cellobiose, lactose, melibiose, gentiobiose, rutinose, fructose and dextrose. Preferably, the reducing sugar is dextrose. If a reducing sugar is to be included in the glaze it is preferred that it be present in an amount of from about 0.1 to about 5% by weight of the glaze. Futhermore, in addition to incorporating sweetening agents into the food product, anhydrous flavoring agents my also be added to the glaze. For example, flavoring agents may further comprise, without limitation, spices, salts, garlic, cheeses, oat bran, cinnamon, cornmeal, lemon coconut, orange, cherry butter or butter flavor and flavor enhancers and the like. Natural and artificial colors may also be added.

The particular edible oil or combination of edible oils utilized in the practice of the present invention is not critical. Instead the oil or combination of oils to be used can be chosen on the basis of convenience, commercial applicability, and desired flavor. For example and without limitation edible oils suitable for use in the present invention include plant derived oils such as olive oil, canola oil, flax seed oil, sunflower seed oil, safflower seed oil, corn oil, peanut oil, walnut oil, soy oil, and the like.

The anhydrous low-density maltodextrin preferably has a density of between 0.05–0.4 g/cc, and in particular that the density is between 0.10 and 0.15 g/cc. Maltodextrin Maltrin M700 with a density of 0.13 g/cc is the most preferred choice of low density maltodextrin. The maltodextrin is mixed with oil and can be applied to the food product in a number of ways so as to entrap the oil layer on the food product. The maltodextrin can be applied in the form of free flowing microscopic balls, or simply by spray onto the food product.

The applicant has found that simply by glazing a food product prior to baking with an anhydrous glaze that a fried-like texture is imparted to the food product on baking. Furthermore, the actual BSV of a dough product is enhanced. It is thought that the glaze on the dough's surface acts to keep the outer surface of the dough malleable without the addition of water, thereby delaying the setting of the outer dough surface, while not affecting the amount of water absorbed by the outer dough surface. In this manner, the outer surface continues to expand as the inner dough is heated, resulting in an increase in the BSV.

Furthermore, the application of the glaze of the present invention to food products eliminates the need for a frying step. As used herein, the term "frying" includes deep-frying, a cooking method that traditionally uses a vat or well of heated oil and is usually employed on products such as pizza crusts, doughnuts, beignets, tortillas and the like. Additionally, "frying" also includes reference to pan-frying in more limited amounts of oil prior to baking which also provides a crisp surface crust to a food product. Examples of food products traditionally prepared in this manner include pizzas, focaccia bread and crumpets.

The present invention is now illustrated in greater detail by way of the following examples, but it should be understood that the present invention is not to be construed as being limited thereto.

EXAMPLE 1

The following anhydrous glaze formulation was applied to Pillsbury® dinner roll dough cut to form doughnuts, available from General Mills, Inc., Minneapolis, Minn.

| Component of Glaze | Percentage |
| --- | --- |
| *Maltrin (M700) Maltodextrin | 14.5% |
| Vegetable Oil | 84.5% |
| Sucrose | 1% |

*Maltrin M700 Agglomerated Maltodextrin; GPC Lot No. M9603871

The low-density maltodextrin allows oil to be incorporated, in the mixture and trapped between the sugar molecules, to increase the amount of oil staying on the dough during baking.

EXAMPLE 2

The following anhydrous glaze formulation was applied to Pillsbury® dinner roll dough available from General Mills, Inc., Minneapolis, Minn. The dough is used to make doughnuts.

| Component of Glaze | Percentage |
| --- | --- |
| *Maltrin (M700) Maltodextrin | 13.89% |
| Vegetable Oil | 76.11% |
| Sucrose | 10% |

*Maltrin M700 Agglomerated Maltodextrin; GPC Lot No. M9603871

The glaze entrapped the oil and the effects of the entrapment increased the amount of oil on the surface of the dough intermediate that was evident in the resulting baked product. The oil dramatically affected the way the dough baked, as seen in the final BSV, texture, appearance, and shape of the products. As seen in FIG. 1 it is apparent that the final baked specific volume (BSV) of the doughnuts created from the dinner roll dough is dependent on how much oil glaze is applied.

Figure 2:
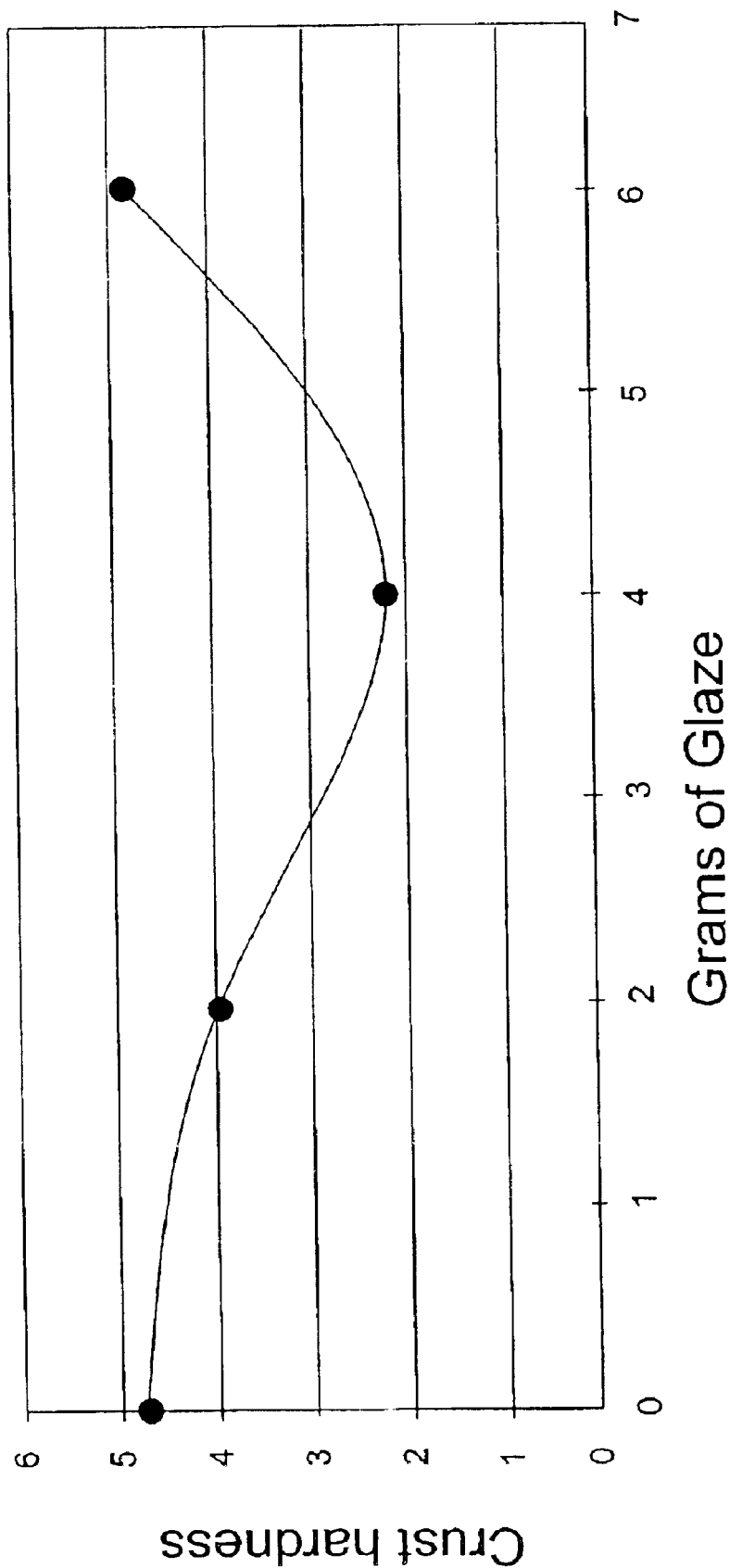
FIG. 2 is a graphical illustration of the level of crust hardness compared to the amount of glaze used.

The amount of glaze applied in accordance with the present invention ranges from between 1 to 11 grams, per serving size, more specifically between 2 and 8 grams and preferably about 3 to 5 grams and more preferably about 4 grams. As seen in FIG. 2, the application of between 3 to 5 grams per serving size produced an acceptable crust hardness and desirable rise in the BSV. Serving size as used herein generally includes a single doughnut or item enclosed in the food package, or the prescribed serving size as provided on the package itself.

The baked products of the present example had a layer of sugar on the top surface, which was slightly oily to the touch. This sugar coating can be modified to mimic a sugar-glazed doughnut. The surface of the glazed baked dough was favorably different from the control dough (without glaze). The color was more golden-brown, and the surface did not resemble a smooth baked surface. The surface appeared flakier and had a slight bubbly appearance. The oil had created a fried-like appearance to the dough.

The glaze used on doughnuts included up to 10% sucrose for sweetening purposes and also caused some browning.

To achieve a dough formulation that had the desired consistency, as well as one that could be worked with easily, the flour/water ratio was selected as follows: flour/water ratio without flavor=1.95; or with flavor=1.90. The target BU (Brabender Units) is 900–1000.

The process used to make the chemically leavened, refrigerated dough on small scale (2000 g) for experiments is outlined below. This includes steps from mixing, sheeting, cutting, and canning the dough.

There were several key developments taken to achieve the desired dough:
1. In processing, the dough temperature of 60° F. was achieved by chilling the mixing bowl in the freezer (0° F.) for 30–45 minutes before mixing the dough.
2. Mix time on a Hobart mixer at speed 2 was decreased from original total of 8 minutes to 6 minutes to decrease stickiness in dough.
3. In dough formulation, the flour/water ratio was adjusted.
4. Shortening was used instead of vegetable oil to increase volume of baked dough.

Final processing:
1. Chill mixing bowl for 30–45 minutes in freezer (0° F.) before mixing.
2. Fat ingredients (shortening, SSL, and mono and diglycerides) were weighed up together.
3. Dry ingredients were weighed up together (flour, conditioner pre-blend, and sweet-whey solids).
4. The dry ingredients were added to the mixing bowl.
5. Weigh up and ice (⅓ of total water), the rest as liquid water. Add the bread flavor, high fructose corn syrup to the mixing bowl. Add TopNote last.
6. Mix for 30 sec on speed 1 of Hobart Mixer
7. Add the fat ingredients.
8. Mix for 3 minutes on speed 2.
9. Cut the dough and add the second stage ingredients (leavening—GDL, Encapsulated soda, Salt).
10. Mix for 30 seconds on speed 1.
11. Mix for 3 minutes on speed 2.
12. Sheet the dough to 12 mm; 3-fold and turn 90°. Sheet dough to 6.7–7 mm.
13. Use doughnut cutter to cut out doughnuts of 60 g.
14. Use canner to can 8 doughnuts in Grands® (available from General Mills, Inc. Minneapolis, Minn.) can (214×509)
15. Cans were then proofed for approximately 2 hours (85° F. and 90% humidity)

Farinograph readings:
480 g of dough was taken to measure the BU's (Brabender Units) on the Farinograph. This was measured immediately following the mixing, to cut down on temperature change effects, and loss of moisture.

Low-density maltodextrin physically entraps the oil molecules, preventing the oil from flowing as readily. This minimized the amount of oil drip from the dough surface before and during baking. Therefore, enough oil stayed on the dough during baking to retain the doughnut shape, and produce a crust that resembled a fried doughnut's crust.

The doughnut dough formulation as used in the above examples is as follows. All weight percentages are approximate:

| Ingredient | Percent |
| --- | --- |
| Flour | 50 |
| Water | 26 |
| Conditioner | 4 |
| TopNote | 2 |
| Flavoring | .25 |
| Mono/Diglycerides | 1 |
| Sweet Whey Solids | 1.5 |
| Shortening | 5 |
| SSL/HFCS | 6.25 |
| Salt | 1 |
| Soda | 1 |
| GDL | 2 |

The doughnuts baked with the glaze had dimensions that were similar to the fried yeast-raised doughnuts. The crucial dimensions that were measured included the final height, diameter, and diameter of the doughnuot hole. The BSV of the doughnuts were also measured. The target dimensions are a diameter of 9.0–9.5 cm, a height of 3.0–4.0 cm. Along with this, the doughnuts need to resemble a circle more than an oval. The BSV for the doughnuts is the highest achieved through use of a glaze. One reason for this observed increased may be the slower baking time of the doughnuts. The layer of oil and sugar on top of the doughnuts slows down the heat transfer and moisture loss at the top crust. The slower heat transfer occurring from the top compared to a baked doughnuts without glaze may also allow the inside dough to be more pliable for a longer period of time to increase the amount expanding inside.

The outside texture of the doughnuts baked with the anhydrous glaze is more crisp and thin than a control baked without glaze. The anhydrous glaze provides a crunchier skin on the doughnuts, compared to a softer one from the fried doughnuts. The following Table I outlines how the Instron compression test of these doughnuts baked with anhydrous glaze compares with the fried and baked doughnuts.

The anhydrous glaze allows the dough to bake up to acceptable dimensions (height, diameter, baked specific volume). These dimensions had been measured on fried yeast-raised Pillsbury's® dough previously. The baked specific volume was measured using rapeseed oil for varying amounts of glaze (0 g to 11 g) applied to the top of the food intermediate. This was done 2 hours after the food intermediate finished baking. Table 1 shows a comparative illustration between baked, fried and baked/glaze coated doughnuts.

TABLE 1

| Doughnut product | Firmness (g/mm) | Inflection (g/mm) |
| --- | --- | --- |
| Baked doughnut | 338.7 | 101.3 |
| Fried doughnut | 157.5 | 152.7 |
| Baked doughnut with glaze | 235.2 | 182.7 |

The anhydrous glaze improves the texture (firmness) from the baked doughnut without the glaze. The difference in texture may be related to the difference found in surface moisture content between a fried doughnut and the glazed baked doughnut. The moisture content in the fried doughnut's outside crust is higher than that of the glazed doughnut. Differences in fat content (glazed being slightly higher than the fried) may also have an effect on texture. Table 2 outlines the fat and moisture content using the anhydrous glaze for the baked doughnut product.

TABLE 2

| Test Subject | % Fat | % Moisture |
| --- | --- | --- |
| Whole doughnut | 18.81 | 21.65 |
| Outside Crust | 28.57 | 11.77 |
| Inside Crumb | 7.14 | 32.45 |

Four doughnut samples were tested to determine the relationship between the softness of the crust and the amount of glazed used on the doughnuts. The four samples included one doughnut with no glaze, another with 2 grams of glaze, one with 4 grams of glaze and the final sample having 6 grams of glaze. The samples were baked in an oven for 23 minutes at a temperature of 325° F. and were then allowed to cool for one hour. Samples were then tested on a texture analyzer.

The analysis showed that the sample having the four grams of glaze had the lowest crust and crumb index and needed the least amount of force to cut through the crust. The stiffness of the crust and crumb was the least in the sample that had no coating and in the one that had 6 grams of glaze applied (see FIG. 2).

In summary, the experimental results show that the anhydrous glaze of the present invention provides a fried texture to a food product without actually subjecting it to a traditional frying step. The presence of the low-density maltodextrin physically entraps the oil on the pre-baked food product so that the oil is effectively retained on the food product and thereby effectively fries the outer surface of the food product both prior to and during baking. The fried texture can be observed when using either a conventional lab oven or an impingement oven. The present glaze can also cause an increase in total area when it is bake in a conventional lab oven.

All publications, patents and patent documents are incorporated by reference herein, as though individually incorporated by reference. The invention has been described with reference to specific and preferred embodiments and techniques. However, it should be understood that many variations and modifications might be made without departing from the spirit and scope of the invention.

It will thus be seen according to the present invention a highly advantageous glaze for imparting a fried texture has been provided. While the invention has been described in connection with what is presently considered to be the most practical and preferred embodiment, it will be apparent to those of ordinary skill in the art that the invention is not to be limited to the disclosed embodiment, that many modifications and equivalent arrangements may be made thereof within the scope of the invention, which scope is to be accorded the broadest interpretation of the appended claims so as to encompass all equivalent structures and products.

What is claimed is:

1. A fried texture imparting glaze for a food intermediate comprising:

a mixture of at least one edible oil;

an anhydrous low-density maltodextrin wherein the density of the maltodextrin is between 0.05–0.4 g/cc;

wherein the glaze is coated in a sufficient amount over a food intermediate to create a food product that after a further treatment step has a fried texture.

2. The fried texture imparting glaze for a food intermediate as recited in claim 1, wherein the edible oil is selected from plant derived oils.

3. The fried imparting glaze for a food intermediate according to claim 1, wherein between 1 to 11 grams of the glaze is applied to the food intermedate.

4. The fried texture imparting glaze for a food intermediate according to claim 1, wherein the maltodextrin comprises free flowing microscopic balls.

5. The fried texture imparting glaze for a food intermediate according to claim 1, wherein the food product is selected from a doughnut, pizza base, pizza roll, beignet, pizza pocket, taco shell, French fries, tortilla shell, croissant, foccacia bread, crumpet or laminated product.

6. The fried texture imparting glaze for a food intermediate according to claim 1, wherein the further treatment step is baking.

7. The fried texture-imparting glaze for a food intermediate according to claim 1, wherein the food product has a higher baked specific volume than an unglazed product.

8. The fried texture imparting glaze for a food intermediate according to claim 1, wherein the at least one edible oil used in said glaze is selected from plant derived oils.

9. A method of imparting a fried surface texture to a food product comprising the steps of;

providing at least one edible oil;

providing an anhydrous low-density maltodextrin wherein the density of the maltodextrin is between 0.05–0.4 g/cc;

mixing said at least one edible oil and said anhydrous low-density maltodextrin to form a glaze;

coating said glaze on a food intermediate; and treating said food intermediate having said glaze to produce the food product having a fried surface texture.

10. The method of imparting a fried surface texture to a food product according to claim 9, further including the step of shaping the pre-baked food product prior to coating the food product with said glaze.

11. The method of imparting a fried surface texture to a food product according to claim 9, wherein the food product is coated with said glaze by dipping the food product in said glaze.

12. The method of imparting a fried surface texture to a food product according to claim 9 wherein the edible oil used in said glaze is selected from plant derived oils.

13. The method of imparting a fried surface texture to a food product according to claim 9, wherein the treating step is baking.

14. The method of imparting a fried surface texture to a food product according to claim 9 including the further step of adding an additional ingredient to said glaze.

15. The method of imparting a fried surface texture to a food product according to claim 14, wherein the additional ingredient is a flavoring agent.

16. The method of imparting a fried surface texture to a food product according to claim 15 wherein the flavoring agent permits browning during treating.

17. The method of imparting a fried surface texture to a food product according to claim 9 wherein the additional ingredient is a coloring agent.

18. The method of imparting a fried surface texture to a food product according to claim 9, wherein the food product is selected from a doughnut, pizza base, pizza roll, beignet, pizza pocket, biscuit, taco shell, French fries, tortilla shell, croissant, foccacia bread, crumpet, laminated product.

19. A method of increasing the baked specific volume of a glazed baked dough product over dimensions of a corresponding unglazed baked dough product comprising the steps of:
coating at least a portion of a food intermediate with glaze composed of at least one edible oil and an anhydrous low density maltodextrin wherein the density of the maltodextrin is between 0.05–0.4 g/cc; and
treating said food intermediate to impart a fried texture to said baked dough product.

20. The method according to claim 19, wherein said dough product is selected from a doughnut, pizza base, pizza roll, beignet, pizza pocket, biscuit, tortilla shell, croissant, foccacia bread, crumpet, puff pastry.

21. The method according to claim 19, wherein the treating step is baking.

* * * * *

UNITED STATES PATENT AND TRADEMARK OFFICE
CERTIFICATE OF CORRECTION

PATENT NO.   : 6,787,170 B2
DATED        : September 7, 2004
INVENTOR(S)  : Lonergan et al.

It is certified that error appears in the above-identified patent and that said Letters Patent is hereby corrected as shown below:

Column 10,
Line 7, "fried imparting" should read -- fried texture imparting --
Line 63, "9" should be -- 14 --

Signed and Sealed this

Fourteenth Day of December, 2004

JON W. DUDAS
*Director of the United States Patent and Trademark Office*